United States Patent

Kisiel

(10) Patent No.: US 8,547,219 B2
(45) Date of Patent: Oct. 1, 2013

(54) AUTOMOTIVE BRAKE LIGHT WITH GRADUATED DISPLAY

(76) Inventor: Anthony J. Kisiel, Brighton, MI (US)

( * ) Notice: Subject to any disclaimer, the term of this patent is extended or adjusted under 35 U.S.C. 154(b) by 596 days.

(21) Appl. No.: 12/813,865

(22) Filed: Jun. 11, 2010

(65) Prior Publication Data

US 2011/0304455 A1    Dec. 15, 2011

(51) Int. Cl.
*B60Q 1/26* (2006.01)
*B60Q 1/52* (2006.01)
*B60Q 7/00* (2006.01)

(52) U.S. Cl.
USPC .......... 340/468; 340/469; 340/470; 340/471; 340/472; 340/473; 340/479

(58) Field of Classification Search
None
See application file for complete search history.

(56) References Cited

U.S. PATENT DOCUMENTS

| | | | |
|---|---|---|---|
| 4,556,862 A * | 12/1985 | Meinershagen | 340/478 |
| 4,600,913 A * | 7/1986 | Caine | 340/435 |
| 4,920,330 A | 4/1990 | Plozner | 340/467 |
| 4,940,962 A | 7/1990 | Sarokin | |
| 4,983,953 A * | 1/1991 | Page | 340/467 |
| 5,089,805 A * | 2/1992 | Salsman | 340/467 |
| 5,258,740 A | 11/1993 | Viano et al. | |
| 5,594,415 A * | 1/1997 | Ishikawa et al. | 340/467 |
| 5,594,416 A * | 1/1997 | Gerhaher | 340/467 |
| 5,657,169 A | 8/1997 | Caroli | |
| 5,798,691 A | 8/1998 | Tim Kao | |
| 5,877,682 A * | 3/1999 | Groeller | 340/479 |
| 6,050,649 A | 4/2000 | Hensley | |
| 6,150,933 A * | 11/2000 | Matsumoto | 340/479 |
| 6,417,767 B1 * | 7/2002 | Carlson et al. | 340/467 |
| 6,663,271 B1 | 12/2003 | Giglio | |
| 6,753,769 B1 * | 6/2004 | Elliott | 340/464 |
| 6,864,787 B1 | 3/2005 | Veach | |
| 7,002,458 B2 * | 2/2006 | Su | 340/465 |
| 7,019,653 B2 | 3/2006 | Benedict | |
| D529,642 S | 10/2006 | Green | |
| 7,375,627 B2 * | 5/2008 | Johnson et al. | 340/468 |
| 8,125,327 B2 * | 2/2012 | Ognibene | 340/479 |
| 2006/0273891 A1 * | 12/2006 | Quach et al. | 340/467 |
| 2008/0036582 A1 * | 2/2008 | Farley | 340/468 |
| 2008/0164993 A1 * | 7/2008 | Douglas | 340/479 |
| 2010/0085180 A1 * | 4/2010 | Mathis | 340/467 |

* cited by examiner

*Primary Examiner* — Julie Lieu
(74) *Attorney, Agent, or Firm* — Young Basile Hanlon & MacFarlane PC

(57) ABSTRACT

An automotive brake light system producing a graduated display according to the level of vehicle deceleration as sensed by an onboard piezoelectric accelerometer. Taillight assemblies are divided into segments which are illuminated in sequence to produce a graduated display. The vehicle antilock brake system may be connected into the system to provide a special lighting effect such as blinking the taillights during a panic stop condition.

1 Claim, 3 Drawing Sheets

AUTOMOTIVE BRAKE LIGHT WITH GRADUATED DISPLAY

SUMMARY OF THE INVENTION

This invention relates to rear-mounted automotive brake light systems and more particularly to a system in which the brake light or lights are illuminated in a graduated fashion to represent and convey information to other drivers regarding different degrees of deceleration of the vehicle.

BACKGROUND OF THE INVENTION

Conventional automotive braking systems are essentially binary in nature; i.e., the lights are illuminated when the brakes are applied and are not illuminated when the brakes are not applied.

U.S. Patent Publication No. 2010/0085180 describes a brake light system using a potentiometer to sense pedal travel or brake application pressure and to produce a signal illuminating a brake light assembly in a graduated fashion thereby to convey information to a following vehicle driver regarding the driver-initiated braking action of the lead vehicle. This system suffers a number of disadvantages, including variability of actual deceleration display from vehicle to vehicle in the field, and the fact that brake application level, whether represented by pedal displacement or brake line pressure, is not a reliable indicator of actual vehicle deceleration. Greater brake pressure and/or pedal displacement may be needed to produce a given degree or deceleration as the brakes wear or, if fluid is depleted, or as vehicle load increases, or as a consequence of any combination of these factors. Furthermore, the quality of the road surface, tire composition and condition, all affect deceleration and even hard brake application may produce a relatively low deceleration rate on gravel, or wet and/or snow or ice-covered surfaces. If a vehicle is equipped with a regenerative brake energy capture system or a Jake/Exhaust/Retarder system, this may affect the relationship between brake pressure and actual deceleration.

BRIEF SUMMARY OF THE INVENTION

The present invention provides an automotive brake light system capable of conveying information to following vehicle drivers which is an accurate indication of vehicle deceleration on all road surfaces and which is repeatable over the useful life of the tires and brake system of a given vehicle. This is accomplished through the use of a vehicle mounted accelerometer which produces an output representing different degrees of vehicle deceleration. This output is connected through an interface, which may be hard-wired or implemented with programmable microcircuits, to illuminate segments of one or more rear-mounted brake light assemblies in a progressive or graduated fashion to represent different degrees of actual vehicle deceleration.

In a preferred form, the brake light assemblies include plastic or glass lenses inside of which are mounted a plurality of LEDs. This implementation has the advantage of substantially instant illumination as opposed to conventional incandescent filament lights, which exhibit a significant delay between the application of current and the production of visible illumination. However, filament and gas discharge or halogen lights can be used with the present invention.

In the illustrative embodiments hereinafter described in detail, the brake light assemblies and the lenses therein can assume any of several geometric shapes. In any of these shapes, it may be desirable to provide a perimeter segment which is lighted in the fashion of a conventional taillight as well as a plurality of contiguously arranged segments within the perimeter which are illuminated in a sequential fashion to show graduated degrees of deceleration. Not every light structure requires a separate lens for each "segment"; e.g., the light sources themselves may be spaced within a single lens to define "segments" which are illuminated progressively in a circle, semi-circle, or even a straight line.

Also in a preferred embodiment of the invention, a vehicle anti-lock system is provided with a suitable signal generator which provides inputs to the interface to show a panic or hard braking condition by creating a special lighting effect; for example, one or both of the vehicle brake light assemblies may be actuated in such a way as to cause a blinking effect.

BRIEF SUMMARY OF THE DRAWINGS

The description herein makes reference to the accompanying drawings wherein like reference numerals refer to like parts throughout the several views and wherein.

DETAILED DESCRIPTION OF THE ILLUSTRATIVE EMBODIMENTS

Figure 1:
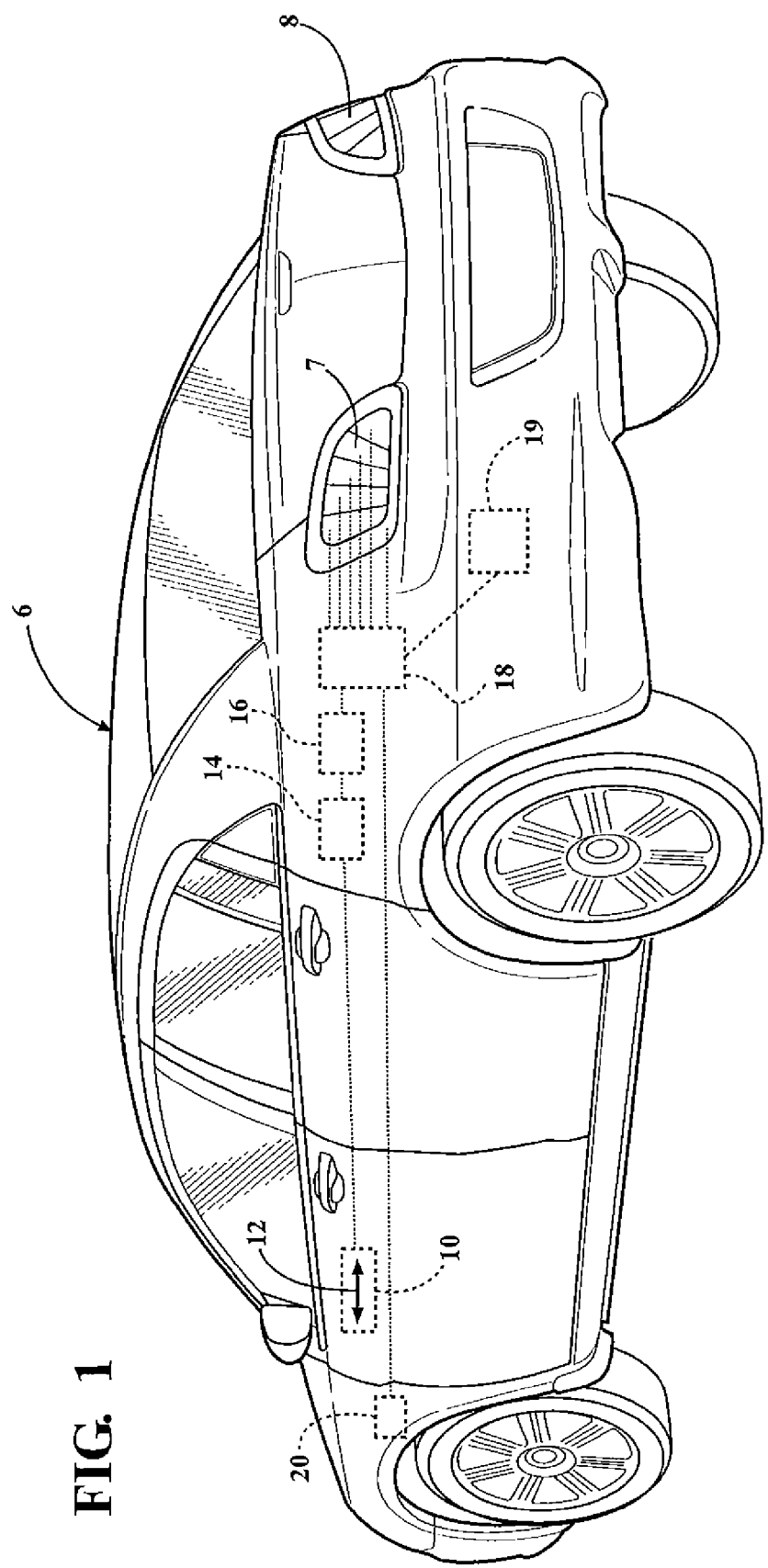
FIG. 1 is a perspective view of an automobile equipped to carry out the invention.
Figure 4:
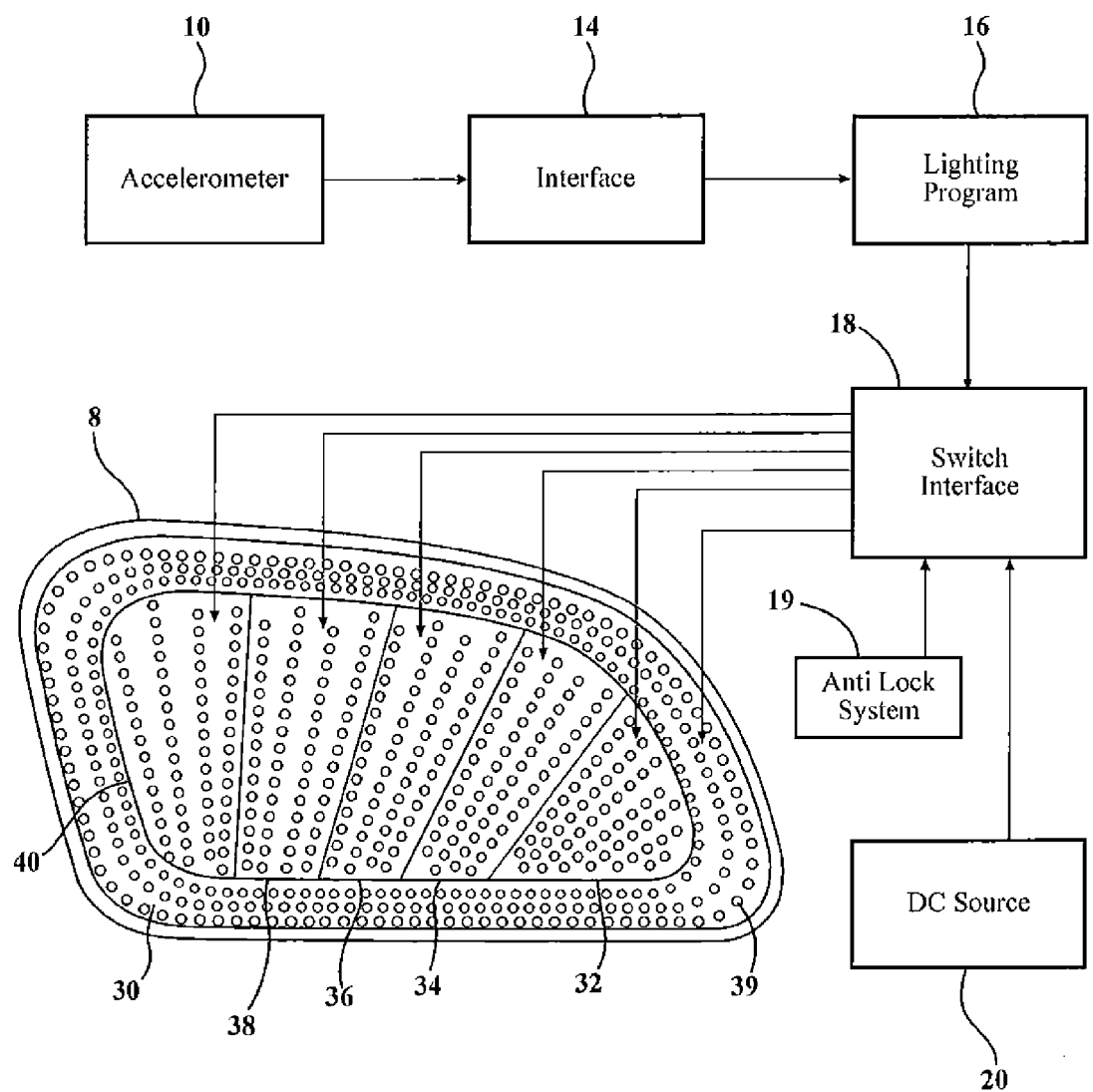
FIG. 4 illustrates a system in block diagram and as applied to the FIG. 2 tail light.

Referring to FIGS. 1 and 4, there is shown a vehicle 6 equipped with rear-mounted, spaced-apart lights 7, 8. The vehicle 6 carries an accelerometer 10 mounted in the vehicle in such a fashion that the sensitive axis of the accelerometer 12 corresponds to the longitudinal axis of the vehicle. The accelerometer is preferably a piezoelectric single axis accelerometer having a range of about 0.02 g to about 2.0 g and producing a proportional output signal which is connected to an interface 14 which converts the output signal by digitization and/or power level switching as necessary to provide a compatible input to a controller 16 such as a microprocessor or microchip in which a lighting program is stored. Suitable accelerometers are available from Freescale Semiconductor, Inc. The term "stored" embraces both or all of (1) hard-wiring with, for example, solid state relay-type devices or switches, (2) software programming, and (3) integrated circuitry available from a variety of manufacturers. Further, while interface 14, controller 16 and interface 18 are shown as separate elements, they may be combined in one integrated circuit. Most vehicle deceleration ranges are from zero to about 2 g and various accelerometers can accommodate this range.

The lighting program interface/controller 16 is connected to a switch unit 18 having multiple outputs connected to respective lighting segments of tail lights 7, 8 to illuminate the light sources in those segments at different deceleration levels. The light sources are preferably solid state devices such as LEDs but can also be incandescent lights, halogen lights, metal-halide lights or other available devices. Power for illumination of the LEDs comes from a DC source 20 which may be the vehicle battery and associated DC electrical system. In addition, switching unit 18 is connected to receive an input from the antilock brake system 19 to provide a panic-stop illumination signal as hereinafter explained.

Brake lights 7, 8 comprise an outer plastic lens which is divided into a number of segments including a peripheral segment 30 and multiple side-by-side contiguous internal segments 32, 34, 36, 38 and 40. LEDs 39 are disposed within these segments to create illumination within the segments which is transmitted through the lens to the rear of the vehicle to inform following drivers to the degree of deceleration experienced by the vehicle 6 as indicated by the output signal from the accelerometer 10.

One exemplary program is to illuminate the peripheral segment 30 under normal driving conditions with a steady state of illumination in the manner of a conventional taillight. A first level of deceleration, for example, caused simply by letting up on the gas pedal of the vehicle, produces a signal from interface 18 which illuminates segment 32. Harder braking and a greater degree of deceleration illuminates segment 34 in addition to segment 32. Additional degrees of deceleration progressively illuminate segments 36, 38, 40 in a graduated fashion to show greater and greater degrees of actual vehicle deceleration. The number and/or wattage of LEDs in each segment is at least approximately the same.

A variation on this program is to use LEDs of greater power output in the larger segments 36, 38, 40 or to use a larger number of more densely packed LEDs to create a higher intensity illumination level in these segments. The graduated illumination program is retained.

Finally, the activation of the vehicle anti-lock system 19 causes a dedicated signal to be applied to the interface 18 to thereafter operate all of the segments 30, 32, 34, 36, 38, 40 in such a way as to cause a blinking action. Alternatively, the blinking action may be limited to certain preselected segments such as peripheral segment 30.

Figure 3:
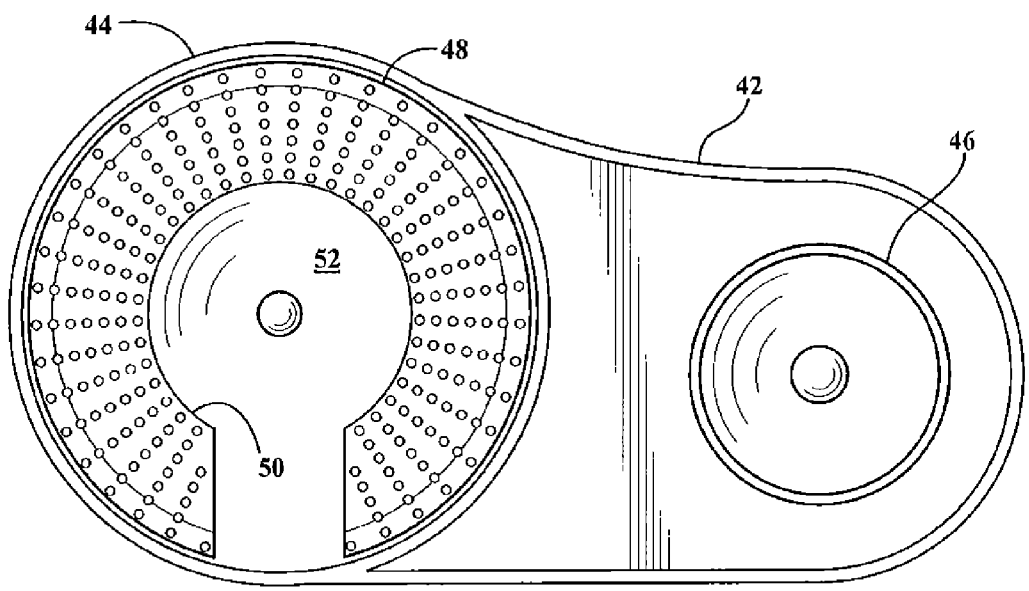
FIG. 3 illustrates second tail light representing a second embodiment.

FIG. 3 shows an alternative geometric shape for a brake light assembly 42. In this case, shaped to include a large circular taillight/brake light 44 and a smaller adjacent back-up light 46 in the same assembly. An integral lens system with red and white areas may be used.

The brake light 44 comprises an outer peripheral segment 48 which is relatively thin and which is equipped with a series of LEDs shining through a diffusing lens to produce a nearly circular band of light. Within that band is a second somewhat wider band 50 which is divided into graduated segments which are progressively illuminated in a clockwise fashion as the output from the accelerometer 10 indicates greater and greater degrees of vehicle deceleration. With the highest degree of vehicle deceleration, the entire band 50 is illuminated.

Within band 50 is an essentially circular center area 52 which is illuminated upon realization of the lowest level of vehicle deceleration. This area 52 can alternatively serve as a running light.

Figure 2:
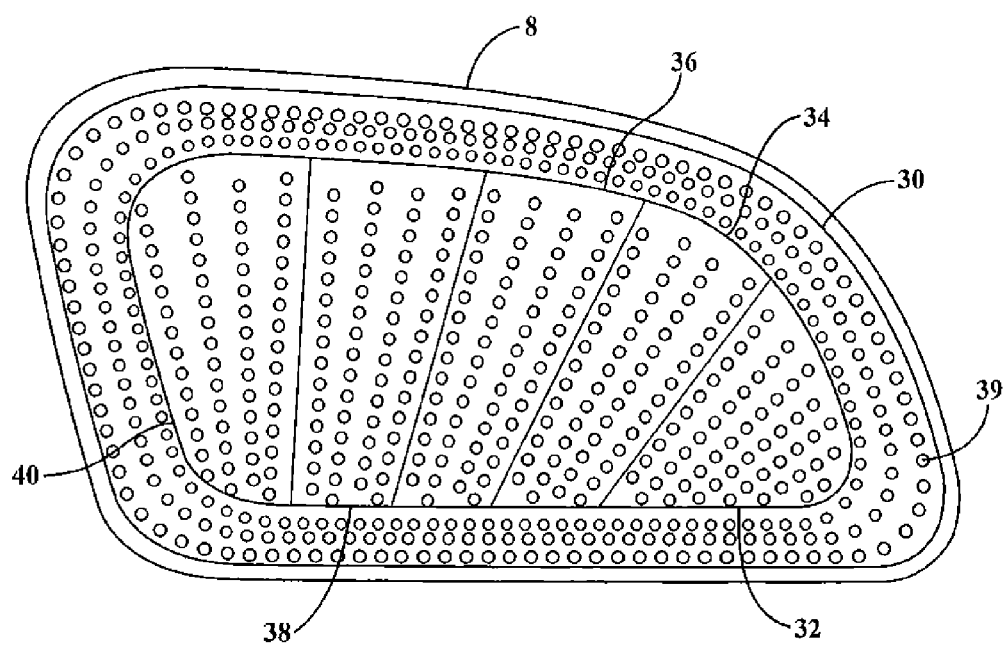
FIG. 2 illustrates a tail light representing a first embodiment of the invention.

The assemblies of FIGS. 2 and 3 are typically used in pairs. Alternatively, the graduated illumination system may be used with a single center-high-mounted-stop-light of any geometric configuration; e.g., a straight line, while the tail lights 7, 8 are operated in conventional fashion. As an added feature, all segments of both lights 7, 8 are turned full "on" in a steady state condition when the vehicle reaches full stop. The return of the accelerometer signal to zero together with a zero speedometer signal triggers this function through the controller 16.

It will be understood that the invention has been described with respect to illustrative embodiments and that many variations including different geometric shapes for the brake light assembly may be used. For definition of the invention, refer to the appended claims.

What is claimed is:

1. A vehicle brake light system comprising:
    a brake light having an illumination area which is subdivided into at least first, second and third areas of graduated size, each area having its own light source;
    a sensor for producing an output signal related to vehicle deceleration rate; and
    a controller connected between the sensor and the brake light to progressively illuminate said areas from the smallest area to the largest area in response to increasing rates of vehicle deceleration; said system further including a lighted peripheral area surrounding said first, second and third areas, and means for illuminating said peripheral area with a constant intensity light.

\* \* \* \* \*